US009616931B2

(12) United States Patent
Sangha et al.

(10) Patent No.: US 9,616,931 B2
(45) Date of Patent: Apr. 11, 2017

(54) RELEASABLE CRADLE TO BODY JOINT

(71) Applicant: GM GLOBAL TECHNOLOGY OPERATIONS LLC, Detroit, MI (US)

(72) Inventors: Balbir S. Sangha, Ajax (CA); Zohir Molhem, Rochester Hills, MI (US); Frederick M. Marquardt, Commerce, MI (US); Munho Kim, Incheon (KR)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/856,080

(22) Filed: Sep. 16, 2015

(65) Prior Publication Data
US 2017/0073009 A1 Mar. 16, 2017

(51) Int. Cl.
*B62D 21/09* (2006.01)
*B62D 21/11* (2006.01)
*B62D 21/15* (2006.01)
*B62D 27/06* (2006.01)
*B62D 25/20* (2006.01)

(52) U.S. Cl.
CPC .............. *B62D 21/15* (2013.01); *B62D 21/11* (2013.01); *B62D 21/155* (2013.01); *B62D 25/2009* (2013.01); *B62D 27/06* (2013.01)

(58) Field of Classification Search
CPC ........ B62D 21/09; B62D 21/11; B62D 21/15; B62D 21/155; B62D 27/06
See application file for complete search history.

(56) References Cited

U.S. PATENT DOCUMENTS

| 5,605,353 | A | * | 2/1997 | Moss | B62D 21/09 188/376 |
| 5,906,410 | A | * | 5/1999 | Dalinkiewicz | B60R 19/00 296/187.03 |
| 6,029,765 | A | * | 2/2000 | Chou | B60K 5/1216 180/292 |
| 6,146,071 | A | * | 11/2000 | Norkus | F16B 37/044 296/187.09 |
| 6,367,869 | B1 | * | 4/2002 | Baccouche | B62D 21/155 280/784 |

(Continued)

FOREIGN PATENT DOCUMENTS

FR 2989052 A1 * 10/2013 ........... B62D 21/155
FR 3005929 A1 * 11/2014 ........... B62D 21/155
(Continued)

Primary Examiner — Laura Freedman
(74) Attorney, Agent, or Firm — Quinn IP Law

(57) ABSTRACT

A releasable joint configured to attach a cradle to an underbody of a vehicle subjectable to an external force includes a fastener, an attachment portion of the cradle, and a partial sleeve. The fastener attaches the cradle to the underbody. The attachment portion of the cradle encircles the fastener and includes a breakaway portion that fractures when the external force exceeds a threshold force. The partial sleeve is attached to and disposed within the attachment portion of the cradle and partially encircles the fastener so as to form an opening that provides a horizontal pathway for the fastener to move through to exit the cradle when the breakaway portion fractures. The cradle may separate from the underbody at the releasable joint with no vertical motion of the cradle relative to the underbody when the external force exceeds the threshold force.

18 Claims, 4 Drawing Sheets

(56) References Cited

U.S. PATENT DOCUMENTS

| | | | | |
|---|---|---|---|---|
| 7,066,531 B2* | 6/2006 | Tomita | B62D 25/082 | 180/68.5 |
| 7,380,829 B2* | 6/2008 | Kishima | B62D 21/155 | 180/232 |
| 7,393,016 B2* | 7/2008 | Mitsui | B62D 25/08 | 180/232 |
| 7,562,886 B2* | 7/2009 | Takeda | B62D 21/155 | 180/232 |
| 7,992,926 B2* | 8/2011 | Tamakoshi | B62D 21/155 | 296/187.09 |
| 8,246,061 B2* | 8/2012 | Kang | B62D 21/11 | 180/232 |
| 8,267,429 B2* | 9/2012 | Takeshita | B62D 21/155 | 280/784 |
| 8,480,102 B2* | 7/2013 | Yamada | B62D 21/155 | 180/311 |
| 8,500,191 B1* | 8/2013 | Baccouche | B62D 21/155 | 280/784 |
| 8,532,881 B2* | 9/2013 | Ostling | F42B 3/006 | 180/271 |
| 8,794,370 B2* | 8/2014 | Hiramatsu | B62D 21/155 | 180/274 |
| 8,794,646 B1* | 8/2014 | Onishi | B62D 21/155 | 280/124.109 |
| 8,863,877 B2* | 10/2014 | Saeki | B60K 1/04 | 180/271 |
| 8,985,630 B2 | 3/2015 | Sangha et al. | | |
| 9,150,252 B2* | 10/2015 | Yasui | B62D 21/11 | |
| 9,150,253 B2* | 10/2015 | Watanabe | B62D 21/11 | |
| 9,221,317 B1 | 12/2015 | Li et al. | | |
| 9,254,872 B2* | 2/2016 | Otani | B62D 21/155 | |
| 2010/0078149 A1* | 4/2010 | Yoshimitsu | B60K 11/04 | 165/67 |
| 2016/0107694 A1* | 4/2016 | Kaneko | B62D 21/11 | 280/784 |

FOREIGN PATENT DOCUMENTS

| | | | | |
|---|---|---|---|---|
| JP | 2002274423 A | * | 9/2002 | |
| JP | 2006051877 A | * | 2/2006 | |
| JP | DE 102013223654 A1 | * | 6/2014 | B62D 21/11 |

* cited by examiner

RELEASABLE CRADLE TO BODY JOINT

TECHNICAL FIELD

This disclosure relates to releasable cradle to body joint.

BACKGROUND

A vehicle may include a cradle attached to an underbody at front and rear joints. The vehicle may be subjectable to an external force. It may be beneficial to release the cradle from the underbody at one or more of the joints in the event that the external force exceeds a threshold force.

SUMMARY

A releasable joint and a vehicle are provided herein. The releasable joint is configured to attach a cradle to an underbody of a vehicle that is subjectable to an external force. The releasable joint includes a fastener, an attachment portion of the cradle, and a partial sleeve. The fastener is configured to attach the cradle to the underbody. The attachment portion of the cradle encircles the fastener and includes a breakaway portion configured to fracture when the external force exceeds a threshold force. The partial sleeve is attached to and disposed within the attachment portion of the cradle and partially encircles the fastener so as to form an opening that provides a horizontal pathway for the fastener to move through to exit the cradle when the breakaway portion fractures. The releasable joint may be configured such that the cradle separates from the underbody at the releasable joint with no vertical motion of the cradle relative to the underbody when the external force exceeds the threshold force. The releasable joint may be located in a rear portion of the cradle.

The vehicle has a cradle and an underbody and is subjectable to an external force. The vehicle includes a releasable joint having a fastener, an attachment portion of the cradle, and a partial sleeve. The fastener attaches the cradle to the underbody. The attachment portion of the cradle encircles the fastener and includes a breakaway portion configured to fracture when the external force exceeds a threshold force. The partial sleeve is attached to and disposed within the attachment portion of the cradle and partially encircles the fastener so as to form an opening that provides a horizontal pathway for the fastener to move through to exit the cradle when the breakaway portion fractures. The releasable joint may be configured such that the cradle separates from the underbody at the releasable joint with no vertical motion of the cradle relative to the underbody when the external force exceeds the threshold force. The releasable joint may be located in a rear portion of the cradle.

The releasable joint and the vehicle release the cradle from the underbody at one or more joints between the cradle and the underbody in the event that the external force exceeds the threshold force. This disclosure applies to any machine or manufacture subjectable to an external force and having a structure similar to a vehicle cradle attached to another structure similar to an underbody. This disclosure applies to any vehicle including, but not limited to cars, trucks, vans, busses, trains, airplanes, and boats.

The above features and advantages and other features and advantages of the present teachings are readily apparent from the following detailed description of the best modes for carrying out the present teachings when taken in connection with the accompanying drawings.

DETAILED DESCRIPTION

Figure 1:
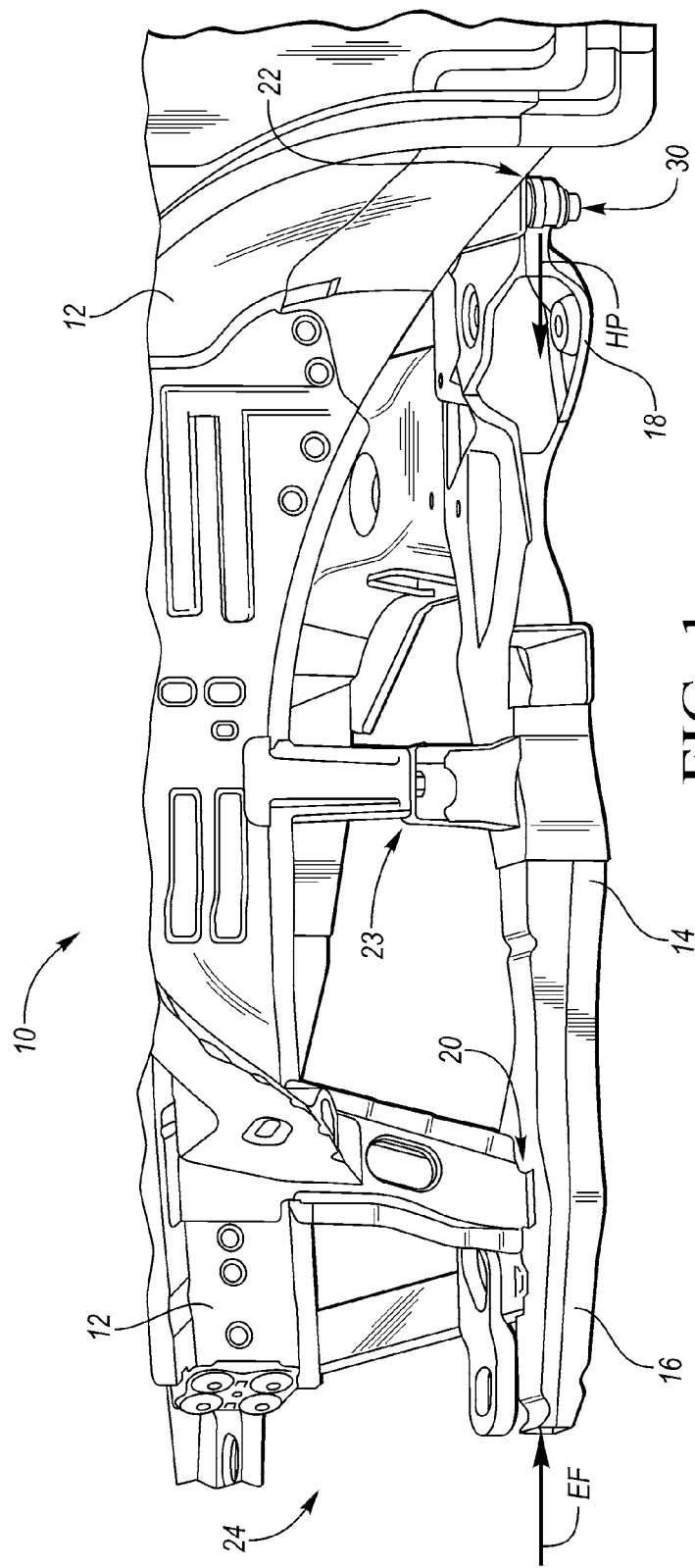
FIG. 1 is a fragmentary schematic perspective illustration of a vehicle subjectable to an external force and having a cradle attached to an underbody via a releasable joint.

Referring to the drawings, wherein like reference numbers refer to like components throughout the views, FIG. 1 shows a vehicle 10 including an underbody 12 and a cradle 14. The vehicle 10 is subjectable to an external force (arrow EF). The cradle 14 has a front portion 16 and a rear portion 18. The cradle 14 may be attached to the underbody 12 at one or more front joints 20 in the front portion 16 of the cradle 14, at one or more rear joints 22 in the rear portion 18 of the cradle 14, and at one or more other joints 23 in other portions of the cradle 14. One or more of the joints 20, 22 is a releasable joint 30. One or more of the rear joints 22 may be a releasable joint 30 if the cradle 14 is located near a front end 24 of the vehicle 10, as shown. Alternatively, one or more of the front joints 20 may be a releasable joint 30 if the cradle 14 is located near a rear end (not shown) of the vehicle 10. Any one of the front joints 20, the rear joints 22, and the other joints 23 may be a releasable joint 30.

Figure 2:
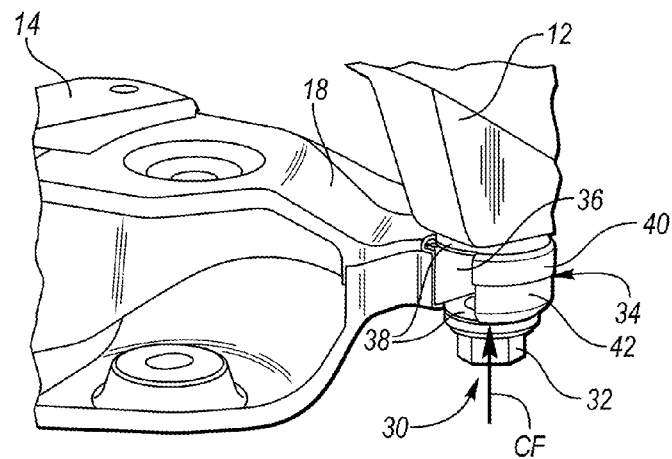
FIG. 2 is a fragmentary schematic perspective illustration of the vehicle of FIG. 1, showing the releasable joint in greater detail.
Figure 3A:
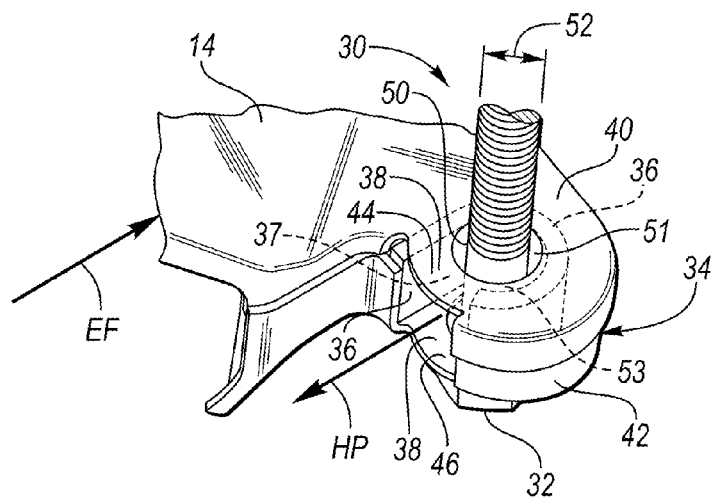
FIG. 3A is a schematic perspective illustration of a first embodiment of the releasable joint of FIG. 1, with the underbody removed for clarity.
Figure 3B:
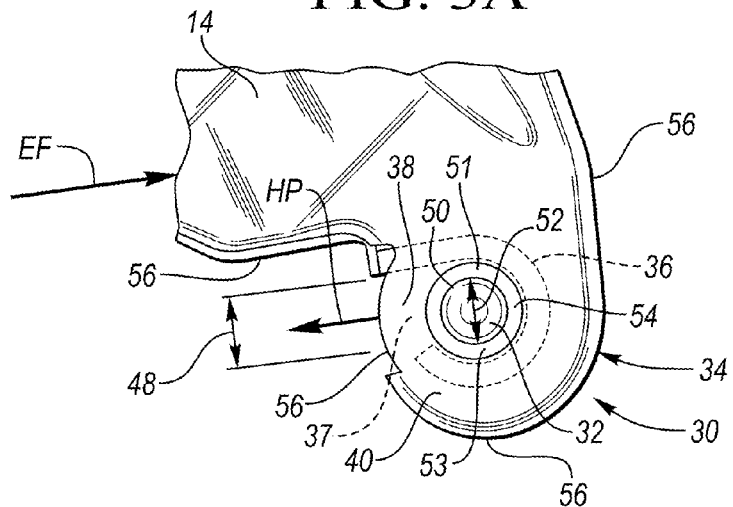
FIG. 3B is a schematic top view illustration of the first embodiment of the releasable joint of FIG. 1, with the underbody removed for clarity.

Referring now to FIGS. 2-3B, the releasable joint 30 includes a fastener 32, an attachment portion 34 of the cradle 14, and an open or partial sleeve 36. The fastener 32 is configured to attach the cradle 14 to the underbody 12. The fastener 32 may include a substantially cylindrical shaft 50 having a diameter 52. The fastener 32 may be a threaded bolt or may be any other suitable fastener.

The attachment portion 34 of the cradle 14 encircles the fastener 32 and includes a fuze or breakaway portion 38 that fractures when the external force (arrow EF) exceeds a predetermined threshold force. The attachment portion 34 of the cradle 14 may include an upper attachment portion 40 and a lower attachment portion 42. The upper attachment portion 40 may be connected to the lower attachment portion 42 via a weld, or via any other suitable attachment. The breakaway portion 38 dimensions and shape are configured such that the breakaway portion 38 will fracture adjacent to the fastener 32 when the external force (arrow EF) exceeds the threshold force.

The upper attachment portion 40 of the attachment portion 34 of the cradle 14 may encircle the fastener 32 and may include the fuze or breakaway portion 38 that fractures when the external force (arrow EF) exceeds the threshold force. Alternatively, the lower attachment portion 42 of the attachment portion 34 of the cradle 14 may encircle the fastener 32 and may include the breakaway portion 38 that fractures when the external force (arrow EF) exceeds the threshold force. In another alternative, as shown in FIGS. 2-3B, the upper attachment portion 40 of the attachment portion 34 of the cradle 14 may encircle the fastener 32 and may include an upper breakaway portion 44 and the lower attachment portions 42 of the attachment portion 34 of the cradle 14 may encircle the fastener 32 and may include a lower breakaway portion 46. A cradle attachment area clearance 51 may be formed between the attachment portion 34 of the cradle 14 and the cylindrical shaft 50 of the fastener 32, as shown in FIGS. 3A-3B.

Referring now to FIGS. 3A-3B, the open or partial sleeve 36 is attached to and disposed within the attachment portion 34 of the cradle 14, between the upper attachment portion 40 and the lower attachment portion 42. The partial sleeve 36 partially encircles the fastener 32 so as to form an opening 37 that provides a horizontal pathway (arrow HP) for the cylindrical shaft 50 of the fastener 32 to move through to exit the cradle 14 when the breakaway portion 38 fractures. The opening 37 of the partial sleeve 36 may have an orientation that is substantially the same orientation as the horizontal pathway (arrow HP). The direction of the horizontal pathway (arrow HP) may be substantially opposite of the direction of the external force (arrow EF) or may be any other desired direction.

The horizontal pathway (arrow HP) of the partial sleeve 36 has a width 48. The partial sleeve 36 may be attached to one or both of the upper attachment portion 40 and lower attachment portion 42 of the attachment portion 34 of the cradle 14, via a weld, or via any other suitable attachment method. The width 48 of the horizontal pathway (arrow HP) may be greater than the diameter 52 of the cylindrical shaft 50 of the fastener 32, as shown. Thus, the fastener 32 may be unobstructed by the partial sleeve 36 as the fastener 32 moves through the horizontal pathway (arrow HP). Alternatively, the fastener 32 may be partially obstructed by the partial sleeve 36 as the fastener 32 moves through the horizontal pathway (arrow HP).

Figure 4A:
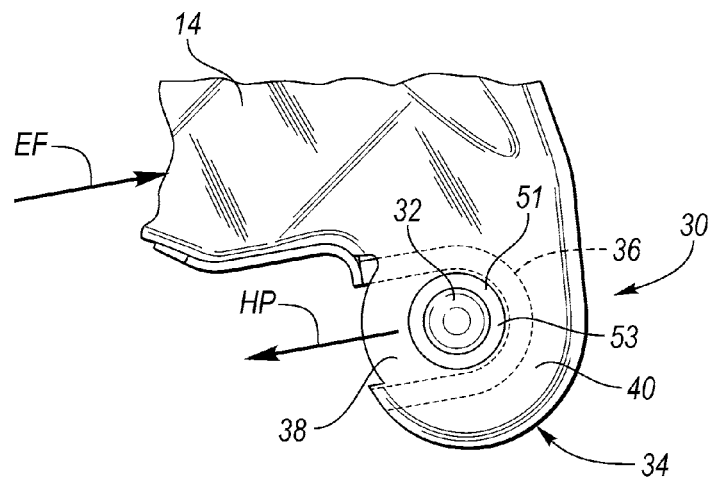
FIG. 4A is a schematic top view illustration of a second embodiment of the releasable joint of FIG. 1.
Figure 4B:
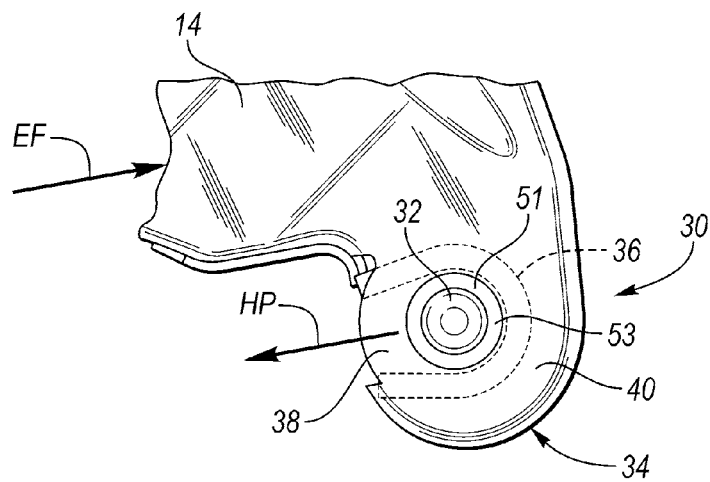
FIG. 4B is a schematic top view illustration of a third embodiment of the releasable joint of FIG. 1.

The partial sleeve 36 may be configured to conform to the cylindrical shaft 50 of the fastener 32 except in the horizontal pathway (arrow HP), as shown in FIGS. 3A and 3B. A partial sleeve clearance 53 may be formed between the partial sleeve 36 and the cylindrical shaft 50 of the fastener 32. Alternatively, the partial sleeve 36 may be configured in a substantially U-shape that conforms to the cylindrical shaft 50 of the fastener 32 except in the horizontal pathway (arrow HP) located in the opening of the U-shape, as shown in FIG. 4A. In another alternative, shown in FIG. 4B, the partial sleeve 36 may be configured in a substantially horseshoe-shape that conforms to the cylindrical shaft 50 of the fastener 32 except in the horizontal pathway (arrow HP) located in the opening of the horseshoe-shape.

Figure 5:
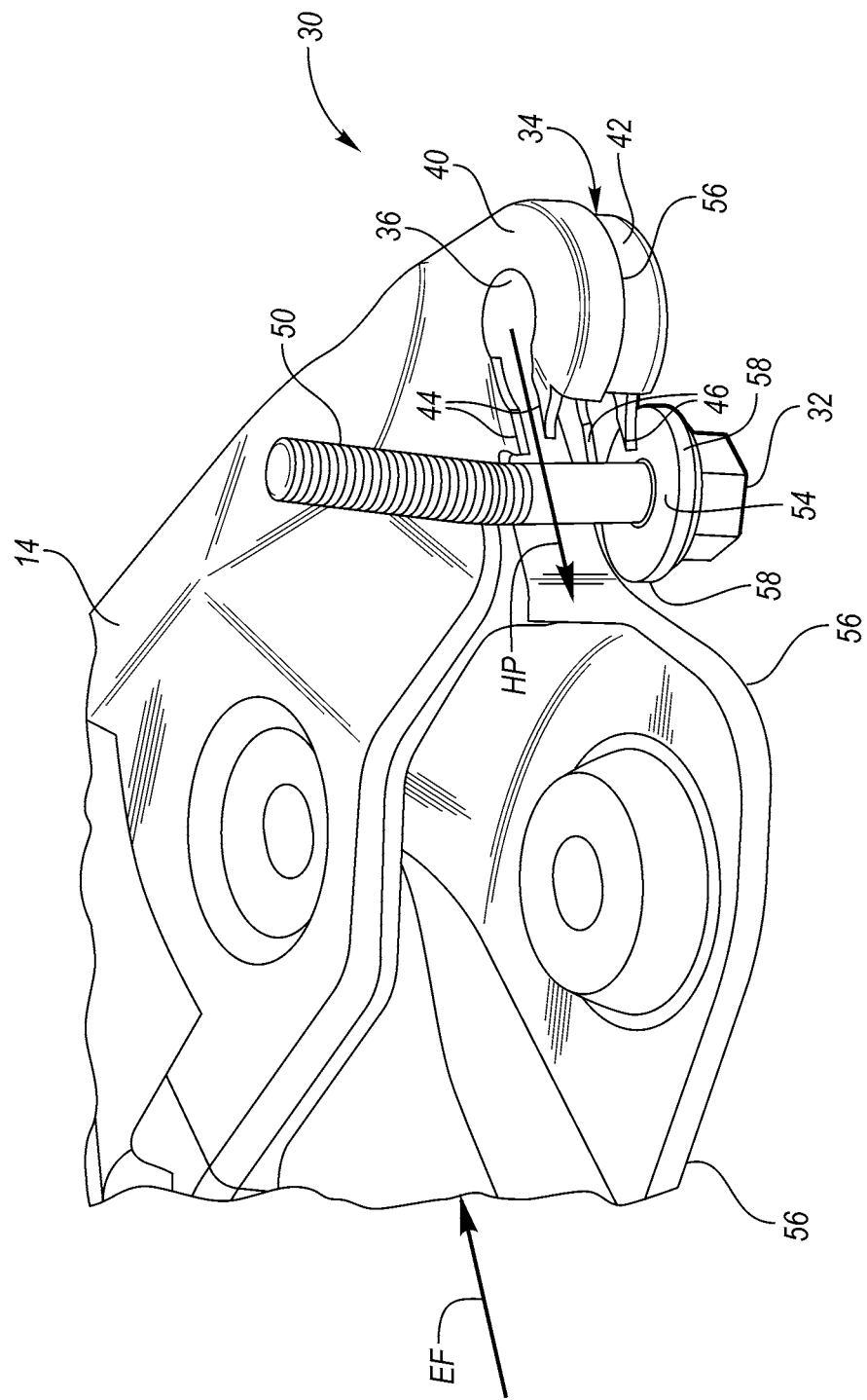
FIG. 5 is a schematic perspective illustration of the releasable joint of FIG. 1 after the external force has exceeded a threshold force and the fastener has exited the cradle through a horizontal pathway without any vertical motion of the cradle relative to the underbody.

The fastener 32 may include a flange or washer 54, best seen in FIG. 5, configured to apply a compressive fastening force (arrow CF), as shown in FIG. 2, to the attachment portion 34 of the cradle 14 and the partial sleeve 36. The compressive fastening force (arrow CF) presses the upper attachment portion 40 of the attachment portion 34 of the cradle 14 against the underbody 12 at the releasable joint 30.

Referring now to FIG. 5, the cradle 14 separates from the underbody 12 at the releasable joint 30 without any vertical motion of the cradle 14 relative to the underbody 12 when the external force (arrow EF) exceeds the threshold force. Vertical motion is defined as motion in a direction normal to the ground plane.

In operation, when the external force (arrow EF) exceeds the threshold force, the fastener 32 begins to move along the horizontal pathway (arrow HP). The external force (arrow EF) first overcomes any friction between the upper attachment portion 40 of the attachment portion 34 of the cradle 14 and the underbody 12 and between the lower attachment portion 42 of the attachment portion 34 of the cradle 14 and the flange 54 of the fastener 32. Next, the external force causes the cylindrical shaft 50 of the fastener 32 to fracture the breakaway portion 38 of the attachment portion 34 of the cradle 14. Finally, the cylindrical shaft 50 of the fastener 32 moves through and out of the horizontal pathway (arrow HP), exiting the cradle 14.

The fastener 32 may deform, as shown in FIG. 5. However, the fastener 32 does not pull down and out of the underbody 12 or up and through the cradle 14. Thus, the cradle 14 separates from the underbody 12 at the releasable joint 30 with only horizontal motion and with no vertical motion of the cradle 14 relative to the underbody 12 when the external force (arrow EF) exceeds the threshold force.

The cradle 14 may have a cradle outer profile or perimeter 56 that follows the outer most edge of the cradle 14 when viewed in a direction normal to the ground plane. The fastener 32 may have a fastener outer perimeter 58 that follows the outer most edge of the fastener 32 when viewed in a direction normal to the ground plane. The fastener outer perimeter 58 may be formed by outer most edge of the flange 54 of the fastener 32. The fastener outer perimeter 58 may be located completely outside of the cradle outer perimeter 56 when the fastener 32 exits the cradle 14, when viewed in a direction normal to the ground plane.

Figure 4C:
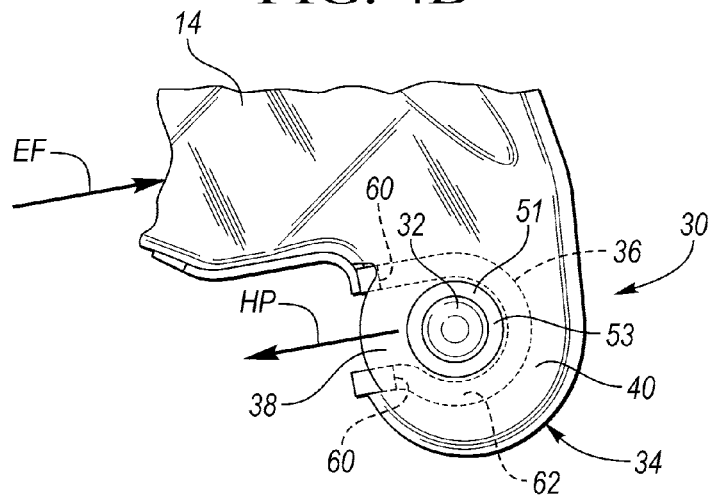
FIG. 4C is a schematic top view illustration of a fourth embodiment of the releasable joint of FIG. 1.

Referring now to FIG. 4C, the partial sleeve 36 may include a step 60. The step 60 may be located on a top surface 62 or a bottom surface (not shown) of the partial sleeve 36, adjacent to the horizontal pathway (arrow HP). The compressive fastening force (arrow CF), as shown in FIG. 2, may be eliminated or substantially reduced when the fastener 32 moves through the horizontal pathway (arrow HP) and past the step 60, shown in FIG. 4C. The elimination or substantial reduction of the compressive fastening force (arrow CF) may eliminate or reduce any friction between the upper attachment portion 40 of the attachment portion 34 of the cradle 14 and the underbody 12 and between the lower attachment portion 42 of the attachment portion 34 of the cradle 14 and the flange 54 of the fastener 32. The step 60 may be located and configured as appropriate to fine tune the operation of the releasable joint 30. One or more steps 60 may be included on the partial sleeve 36 on the top surface 62 of the partial sleeve 36, as shown, and on the bottom surface (not shown) of the partial sleeve 36.

While the best modes for carrying out the many aspects of the present teachings have been described in detail, those familiar with the art to which these teachings relate will recognize various alternative aspects for practicing the present teachings that are within the scope of the appended claims.

The invention claimed is:

1. A releasable joint configured to attach a cradle to an underbody of a vehicle subjectable to an external force, the releasable joint comprising:

a fastener configured to attach the cradle to the underbody;

an attachment portion of the cradle that encircles the fastener and includes a breakaway portion configured to fracture when the external force exceeds a threshold force; and a partial sleeve attached to and disposed within the attachment portion of the cradle and partially encircling the fastener so as to form an opening that provides a horizontal pathway for the fastener to move through to exit the cradle when the breakaway portion fractures;

wherein the releasable joint is configured such that the cradle separates from the underbody at the releasable joint with no vertical motion of the cradle relative to the underbody when the external force exceeds the threshold force.

2. The releasable joint of claim 1, wherein the releasable joint is located in a rear portion of the cradle.

3. The releasable joint of claim 1, wherein the cradle has a cradle outer perimeter;

wherein the fastener has a fastener outer perimeter; and wherein the fastener outer perimeter is located outside of the cradle outer perimeter when the fastener exits the cradle.

4. The releasable joint of claim 1, wherein the breakaway portion includes an upper breakaway portion and a lower breakaway portion.

5. The releasable joint of claim 1, wherein the fastener includes a flange configured to apply a compressive fastening force to the attachment portion and the partial sleeve.

6. The releasable joint of claim 5, wherein the partial sleeve includes a step; and wherein the compressive fastening force is eliminated when the fastener moves through the horizontal pathway and past the step.

7. The releasable joint of claim 1, wherein the fastener includes a cylindrical shaft; and wherein the partial sleeve is configured to conform to the cylindrical shaft except in the horizontal pathway.

8. The releasable joint of claim 1, wherein the fastener includes a cylindrical shaft; and wherein the partial sleeve is configured in a substantially horseshoe-shape that conforms to the cylindrical shaft except in the horizontal pathway located in an opening of the substantially horseshoe-shape.

9. The releasable joint of claim 1, wherein the fastener includes a cylindrical shaft; and wherein the partial sleeve is configured in a substantially U-shape that conforms to the cylindrical shaft except in the horizontal pathway located in an opening of the substantially U-shape.

10. The releasable joint of claim 1, wherein the fastener includes a cylindrical shaft having a diameter;

wherein the horizontal pathway has a width; and wherein the width of the horizontal pathway is greater than the diameter of the cylindrical shaft.

11. A vehicle having a cradle and an underbody and subjectable to an external force, the vehicle comprising:

a releasable joint having:

a fastener attaching the cradle to the underbody;

an attachment portion of the cradle that encircles the fastener and includes a breakaway portion configured to fracture when the external force exceeds a threshold force; and a partial sleeve attached to and disposed within the attachment portion of the cradle and partially encircling the fastener so as to form an opening that provides a horizontal pathway for the fastener to move through to exit the cradle when the breakaway portion fractures;

wherein the releasable joint is configured such that the cradle separates from the underbody at the releasable joint with no vertical motion of the cradle relative to the underbody when the external force exceeds the threshold force.

12. The vehicle of claim 11, wherein the releasable joint is located in a rear portion of the cradle.

13. The vehicle of claim 11, wherein the cradle has a cradle outer perimeter; and wherein the fastener has a fastener outer perimeter; and wherein the fastener outer perimeter is located outside of the cradle outer perimeter when the fastener exits the cradle.

14. The vehicle of claim 11, wherein the fastener includes a flange configured to apply a compressive fastening force to the attachment portion and the partial sleeve.

15. The vehicle of claim 14, wherein the partial sleeve includes a step; and wherein the compressive fastening force is eliminated when the fastener moves through the horizontal pathway and past the step.

16. The vehicle of claim 11, wherein the fastener is a threaded bolt.

17. The vehicle of claim 11, wherein the fastener includes a cylindrical shaft; and wherein the partial sleeve is configured to conform to the cylindrical shaft except in the horizontal pathway.

18. The vehicle of claim 11, wherein the fastener has a cylindrical shaft having a diameter;

wherein the horizontal pathway has a width; and wherein the width of the horizontal pathway is greater than the diameter of the cylindrical shaft.

* * * * *